(12) United States Patent
Arsenich

(10) Patent No.: US 6,761,459 B1
(45) Date of Patent: Jul. 13, 2004

(54) PROJECTION SYSTEM

(76) Inventor: Svyatoslav Ivanovich Arsenich, ulitsa Ash-khabadskaya,d.21,kv. 35, Moskovskaya oblast, Reutov (RU), 143952

( * ) Notice: Subject to any disclaimer, the term of this patent is extended or adjusted under 35 U.S.C. 154(b) by 0 days.

(21) Appl. No.: 10/030,399
(22) PCT Filed: Jul. 8, 1999
(86) PCT No.: PCT/RU99/00231
§ 371 (c)(1), (2), (4) Date: Jan. 7, 2002
(87) PCT Pub. No.: WO00/03271
PCT Pub. Date: Jan. 20, 2000

(51) Int. Cl.$^7$ .................. G03B 21/00; G03B 21/26; G03B 21/28; G03B 21/56; G03B 27/22
(52) U.S. Cl. .................. 353/122; 353/94; 353/7; 353/10; 353/99; 353/30; 359/443; 359/453; 359/459; 359/462; 359/471
(58) Field of Search ................ 353/122, 94, 7, 353/10, 99, 30; 359/443, 448, 453, 454, 455, 456, 457, 458, 452, 462, 471; 348/443, 452, 455, 458, 459, 462, 471

(56) References Cited

U.S. PATENT DOCUMENTS 6,469,830 B1 * 10/2002 Dubin et al. ................ 359/449
6,543,899 B2 * 4/2003 Covannon et al. ............ 353/7
6,574,047 B2 * 6/2003 Hawver ...................... 359/626
6,600,528 B2 * 7/2003 Colgan et al. ................ 349/95
6,600,600 B2 * 7/2003 Chen .......................... 359/459
6,601,961 B1 * 8/2003 Masaki ........................ 362/26
6,609,799 B1 * 8/2003 Myers ........................ 359/613

FOREIGN PATENT DOCUMENTS

| EP | 0240045 | 10/1987 | G03B/21/62 |
| EP | 0825480 | 2/1998 | G03B/21/60 |
| RU | 101319 | 10/1952 | G03B/21/62 |

OTHER PUBLICATIONS

English–language translation to Russian Patent No. 101319.
Part of a Russian Text book "6OnbwE3kPAHHbIE BNAE-OCNCTEMBI"—Chapter 3 with English–language translation attached, 1993.

* cited by examiner

Primary Examiner—Russell Adams
Assistant Examiner—Melissa J Koval
(74) Attorney, Agent, or Firm—Baker Botts LLP

(57) ABSTRACT

The present invention relates to projection systems for displaying visual information in a variety of applications in order to reduce the projection area, the weight and the dimensions thereof. In one embodiment, the projection system for producing an external surface projection on a visualization screen comprises a flat and thin visualization screen for carrying out projection on both sides. Images can be watched on the left side and on the right side of this screen. From the surface of the screen and on the left and right sides thereof, projectors are provided for projecting images simultaneously on both sides of the screen. Light diffusers are provided on both sides of the screen. The projections are converted through the optics of the projectors so as to form reduced-divergence projection beams which are entirely captured by the light diffusers and which are diverted and diffused at wide angles of image observation ranges.

13 Claims, 1 Drawing Sheet

US 6,761,459 B1

PROJECTION SYSTEM

FIELD OF THE INVENTION

The invention relates to projection systems to project mono- and stereoscopic images on a large viewing screen by the optical projection technique.

The proposed projection systems are intended for the consumer-oriented and professional applications in cine-, tele-, video- and computer-projection, projection of theatrical scenery, advertisements, as well as for other purposes. For generating the projected images, the presently-used and proposed updated episcopes, diascopes, cine-projectors, and video, tele- and computer projectors can be used. The proposed reflecting or translucent viewing screens are capable of providing high optical parameters of the screen images and considerable operation capabilities of projection not known in the prior art.

PRIOR ART

The extensively-used and available projection systems comprise a projector and a projection screen. The front-projection systems serve to project images onto a reflecting (front-projection) screen or a white wall, and the rear-projection ones—to project images onto a translucent (rear-projection type) screen. U.S. Pat. No. 6,600,600 to Chen, Shane; U.S. Pat. No. 6, 609,799 to Myers, Kenneth J.; U.S. Pat. No. 6,543,999 to Covannon et al.; U.S. Pat. No. 6,601,961 to Masaki, Tadahiro; U.S. Pat. No. 6,600,528 to Colgan et al. and U.S. Pat. No. 6,469,830 to Dubin et al disclose variations on projection screen that performs the diffusive scattering.

For example U.S. Pat. No. 6,469,830 teaches that a rear-projection screen has, at the side of projection onto the screen (at the reverse, or rear side of the screen), a lens raster, surface area of all the raster lenses covering the entire surface area of an image (that is projected onto the screen); the screen, at its front side (from the viewers' side), is provided with a plate having a surface that scatters the light diffusively; on which surface each one of the raster lenses focuses the projection rays; for the purpose to smooth over the viewed brightness uniformity, when viewing an on-screen image, a number of projectors is positioned behind the screen(each of them being positioned at a pre-determined projection point to provide a greater density of the image dots (that are focused by the raster lenses), as well as for the purpose to arrange an optimal directional pattern of the viewed on-screen image so that to enhance the on-screen image brightness uniformity (when said image is seen by viewers from different viewing sectors).

The known projectors are described in: Makartsev V. V., Khesin A. Ya., Steierberg A. L., Large-screen video systems, Moscow, <<Panas>> publishers, 1993, pp. 15–22, 57–83, 96–99, 147–155, FIGS. 1, 2 and 22, 23.

The major disadvantage of the above-discussed projection systems is their large dimensions and considerable weight. This disadvantage is connected with the necessity to carry out projection in a large projection space between a projector and viewing screen at a projection distance that must be not less than the length of the screen image diagonal. Further, there is a possibility that the projection and images on the screen can be shadowed by viewers and objects that are present in this space. The technical paradox is that a reflecting or translucent viewing screen in case of projection of a bright and sharp image must reflect or, respectively, transmit the projected light flux to the maximal extent. Thereupon in viewing the screen images when a viewing screen has an external parasitic illumination, the image contrast deteriorates significantly, brightness is lowered at the edges of the screen image field, and the colour-rendering accuracy is lost. These parameters can be optimal only on a black screen (similar to a black screen of the direct vision kinescopes). In this case, a lower quality of the screen images restrains possibilities to use projection systems in illuminated premises and outdoors. This difficulty is connected with design problems of the modern projection systems that permit the projection within the projection angles (angle of the axis inclination with respect to the viewing screen perpendicular) of not over 30°.

A rear projection system comprising a lenticular-raster rear projection (translucent) viewing screen is the most proximate one to the claimed invention in terms of the set of the characteristic features and attained technical result. The screen consists of two parts: on the projection side disposed is a Fresnel lens, whereto, on the viewer side, attached are vertically positioned are lenticular elements divided by black vertical strips. The presence of these black strips ensure an image of an high contract even in brightly-illuminated premises. Axial magnification factor (of brightness) of a screen is 5.7 units. A Fresnel lens having a very great axial directivity factor (up to 100) concentrates the projector light flux within a very narrow angle of diffusing. Lenticular lenses direct the concentrated light flux in slots between the black vertical strips, diffusing the same in the viewer direction within a relatively broad observation angle. Thereby an optimum tradeoff of the light concentration (luminous efficacy) and viewing zone width against the screen reflectance is achieved. A dark screen is not sensitive to external illuminations, and an high concentration of light in narrow slots is perceived as an high brightness of an image.

A disadvantage of the rear- and front projection systems is the necessity of a large volume of the projection space, without shadowing by external objects. Further, the lenticular-raster screens are known to reduce significantly the brightness and colour-rendering accuracy from the centre to edges of the screen image, particularly when in viewing at the aspects near to the edge of the viewers' location sector. Besides, an excessive growth of dimensions and weight of the prior-art rear projection systems is caused by the necessity to place a projection system in a light-protected premises or a housing containing projection mirrors, and the need to have means for rigid suspension of a projector. These problems, and also the need for a longer projection distance between a projector and screen (comparable with the image diagonal length) complicate design of the prior-art rear- and front projection systems and make them more expensive.

DISCLOSURE TO THE INVENTION

The object of the invention is to provide inexpensive small-dimension and lower-weight projection systems having reflecting or translucent viewing screens to project mono- and stereoscopic quality images in any scales of magnification of an image in a bright external parasitic illumination of the screen image.

The common technical result achieved through embodying of the claimed invention is a flat design of a projection system that provides a reduction of the projection space, improvement of the basic parameters and also provides novel parameters of a projection system, with a maximal luminous efficacy by virtue of effecting the projection from the screen end-face.

An additional technical result according to claim 2 is the possibility of the separate or simultaneous frontal and/or translucent projections and viewing of images from two sides of a screen.

Another additional technical result according to claims 3 and 4 is the use of the end-face projection to project the rays into the interior of a screen in the form of a light guide to form a screen image by way of multiple reflection of the rays in a light guide. This approach will exclude shadowing of the projection and that of the pre-screen and post-screen projection space volume.

Still another additional technical result according to claim 5 is formation of a screen image in projection of the rays that correspond to certain image elements (pixels) and characterised with different angles of entrance—incidence on the reflecting surfaces inside a screen so that to output said rays by screen light-diffusers in the appropriate coordinates of a screen image formation.

Still another additional technical result according to claim 5 is broadening of the screen area having an anti-flare protection, or that of the screen's controlled transparency, and reduction of the area of the screen image visible elements.

Still another additional technical result according to claim 6 is a reduction of the projection space or the light-guide screen thickness by the optical narrowing of longitudinal section of the projection rays using the projectors' projection lenses.

Still another additional technical result according to claim 7 is a reduction of the projection space or thickness of the light-guide screen by the optical narrowing of longitudinal section of the translucing projection rays in the illumination system of a transparency projector, without the use of projection lenses.

Yet another technical result of application of the invention according to claim 8 is the possibility of an easy viewing of stereoscopic images, without the use of stereoscopic spectacles, to be provided for a moving viewer, as well as the possibility of simultaneous viewing of different images by different viewers on a common screen at various aspects of observation of images.

Said technical effect of embodying the invention is to be achieved as follows: A projection system comprises one or a number of projectors for generation and/or projection of transformed and/or trapezoid image frames, and a viewing screen. The optical elements are arranged on the view screen, have entrance windows for capturing projection rays and are configured to reflect or deflect the projection rays via exit windows into a sector of observation. A distinguishing feature is that the entrance and exit windows have an area that is multiple times smaller than the screen area around the entrance and exit windows, and an optical system is provided to register cross sections of the projection rays with the entrance windows of the optical elements, and the optical elements are configured to capture the projection rays directed from an end-face of the viewing screen across its surface.

The distinction is in that the light-diffusers are implemented in the form of optical elements adapted to capture the projection rays directed from the screen end-face along the screen plane and, subsequently, reflect or deflect, optically, said rays, with simultaneous diffusing of the same, into the sector of the screen image viewing. For optical magnification and ensuring a projection sharpness depth over the entire screen area, the projectors and viewing screens are provided with an optical system to transform the projection images and to narrow cross-section of the projection rays to the width of entrance windows of the light-diffusers.

In other words, the claimed projection system, comprising one or several projectors and a viewing screen, whereon light-diffusers of the projection rays are provided, is characterised in that the light-diffusers are designed to capture the projection rays directed from the screen end-face along its surface and, subsequently, deflect, optically, said rays, with simultaneous diffusing of the same, into the sector of viewing of an image formed on a screen, and further comprises an optical system that transforms the projected image and matches cross-sections of the projection rays with the entrance pupils of the light-diffusers provided on the screen, so that to provide a sharpness depth of the projected image over the entire surface of the screen.

According to claim 2, the viewing screen is designed to carry out projection from the screen end-face onto the frontal and/or the reverse (from the viewer's side) surface of the screen, and for said purpose the light-diffusers are implemented in the form of protruding from, or recessed in the screen surface—mirrors, lenses, prisms for capturing, deflecting or diffusing of the rays projected from the screen end-face. Id est, the projection system is characterised in that the viewing screen is implemented as having the end-face reflectors of the projection, and/or the projectors are disposed at the screen end-face to carry out projection onto the frontal (from the viewer's side) and/or reverse surface of said screen. The light-diffusers are designed in the form of protruding from, or recessed in the screen surface, optical elements. These elements are implemented in the form of lenses, prisms that completely capture all projection rays that are incident upon the surface of the screen image formation.

In another embodiment of the protection system according to claim 3, the projection system is characterised in that the viewing screen is provided with a light guide in the form of a flat-parallel plate, or a laminate or multi-strip light-guide. The light-guide core has a constant refraction index and has the end-face transparent entrance windows for inputting the parallel projection rays into the light guide. On the light-guide surface, locally over the screen area, disposed are dot-shaped or linear light diffusers to output the projection rays out of the light guide within predetermined coordinates of the screen image formation. Thereafter these light guides diffuse these projection rays into the screen image viewing sector. A projector or projectors are provided with an optical system for forming narrow parallel projection rays and for supplying these rays through the light-guide end-faces into predetermined coordinates or incidence of the rays upon the light-guide planes. Such arrangement ensures propagation of the rays inside the light guide up to certain light diffusers owing to multiple internal reflection from the light-guide surfaces, free from the screen light diffusers. Some projection rays, captured by appropriate light diffusers, exit from the light guide and are diffused into the screen image viewing sector.

According to claim 3, in the viewing screen, the light-guide core is implemented as having the narrowed, wedge-wise, light-guide thickness in from the light guide's entrance end-face in the direction of propagation of rays in the light guide. The core has a constant refraction index and is coated with a cladding or an optical entrance window of a light diffuser having a constant or stepped refraction index whose value is lower than that of the core. For any of these versions of embodiment of the light-guide screen, a projector is provided with an optical system for formation of projection of rays of the projected image's various elements, which rays are characterised by different angles at which angles these rays enter the light-guide end-face. Such arrangement provides a selective output of these rays out of the light guide by the screen light diffusers within the appropriate coordinates of formation of a screen image. Then these rays are diffused into a sector of observation of the image.

According to claim 4 of the invention, the projection system is characterised in that the entrance and exit windows of the screen's light diffusers have a minimal area, that is multiple times smaller than the screen area around the windows. In one embodiment, the screen area around the exit windows on the screen is coated with an opaque anti-flare black layer. In another embodiment, on the screen area between the light diffusers, an opaque anti-flare black mesh is disposed. In the third embodiment, the screen area around the light diffusers is optically transparent or coated with a photochrome film to adjust transparency of the screen using the ultraviolet background illumination.

According to claim 5, the projection system is characterised in that the projector is equipped with a projection telephoto lens and anamorphotic cylindrical lens, or a cylindrical mirror for a minimal magnification of the projection size, for example a magnification in height, and for simultaneous magnification of the projection to the screen width. The projector is positioned at a predetermined distance from the screen, and on the end-face of the screen width positioned is a mirror retrodirective reflector to deflect the projection from said end-face over the screen surface. In another embodiment, the projector or projectors are disposed near the screen end-faces, and on the screen end-faces positioned are the mirror reflectors for multiple reflection of the projection. These embodiments provide the optimal narrowing of cross-section of the projection rays within the area of the light diffusers' entrance windows.

According to claim 6, the projection system is characterised in that a transparency projector and a screen are provided with an optical system to transform the projection images and to narrow cross-section of the projection rays without the use of projection lenses and transforming anamorphotic lenses. For this purpose, in the transparency projector, an illuminator of the transparent projected images is provided with an optical system for formation of the background illumination of slides by thin, fan-wise diverging rays, cross-sections of the rays being broadened within sizes of area of entrance windows of the light diffusers.

According to claim 7, the projection system is characterised in further comprising one or several stereo projectors and a stereo screen having light diffusers and a lenticular stereo raster. The stereo raster is intended for spatial selection of the left and right images of a stereo couple to the zones of vision of the stereo couple's left and right images by, respectively, the viewer's left and right eyes. For easy, without spectacles, viewing of stereo images from at aspect or in case when viewers move laterally, the system is provided with a semi-automatic manually-controlled corrector, In another embodiment, the system is provided with an automatic corrector coupled to a sensor for tracking the viewers' eyes coordinates. Said semi-automatic or automatic correctors comprise a drive for carrying out various methods of correcting the stereoscopy system, for example by way rotating the stereo screen about its vertical axis, or by displacing the lenticular raster, or displacing the stereo projectors along the screen. This arrangement also provides the optical automatic conjugation of zones of vision of the images, stereo couples with the viewer's left and right eyes when a viewer moves, and also provides the possibility of simultaneous viewing of different images by different viewers in different observations aspects.

EMBODIMENTS OF THE INVENTION

Figure 1:
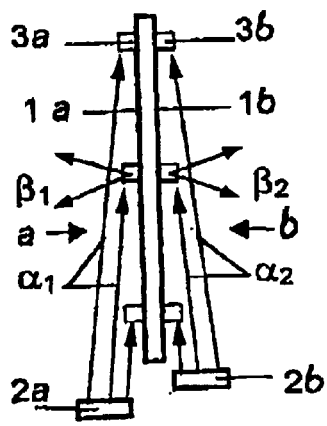
FIG. 1 shows a side view of a projection system for projecting and viewing of images from both sides of a screen and having two end-face protectors from the side of the lower end-face of the screen.
Figure 2:
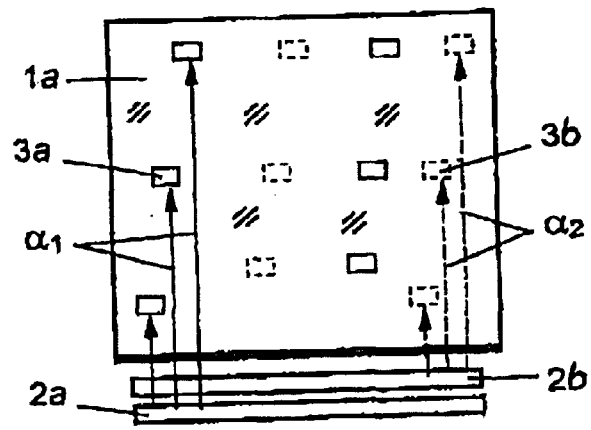
FIG. 2 shows the left frontal side of said screen.

In the first embodiment of the claimed projection system as shown in FIGS. 1 and 2: viewing screen 1 is designed as a flat thin plate; in the lower end-face of the screen, projectors 2$a$ and 2$b$ are positioned. On both sides of the screen, the area of observation of the screen images is provided with light diffusers 3$a$ (on the front side a of the screen), and light diffusers 3$b$ on the front side b of the screen. The light diffusers are intended to capture the projection rays $\alpha_1$ and $\alpha_3$ (directed from the screen end-face) and for subsequent deflection and diffusing of the rays, respectively, in angle $\beta_1$ of the screen image observation sector from side a of the screen, and in angle $\beta_2$ of observation sector of another screen image from side c of the screen. Screen surfaces 1$a$ and 1$b$ around the light diffusers are coated with an anti-flare black opaque layer, or are transparent or coated with a photochrome film (to adjust transparency by the external ultraviolet illumination). Projector 2$a$ is positioned from a side of the screen to project images (rays $\alpha_1$) upon screen surface 1$a$ at a small angle to that surface. Projector 2$b$ is positioned from b side of the screen to project images (rays $\alpha_2$) upon surface 1$b$ of the screen at a small angle to said surface.

Figure 3:
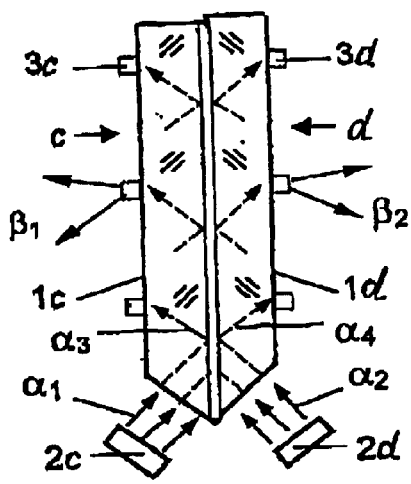
FIG. 3 shows a side view of a rear projection system having a light-guide viewing screen.
Figure 4:
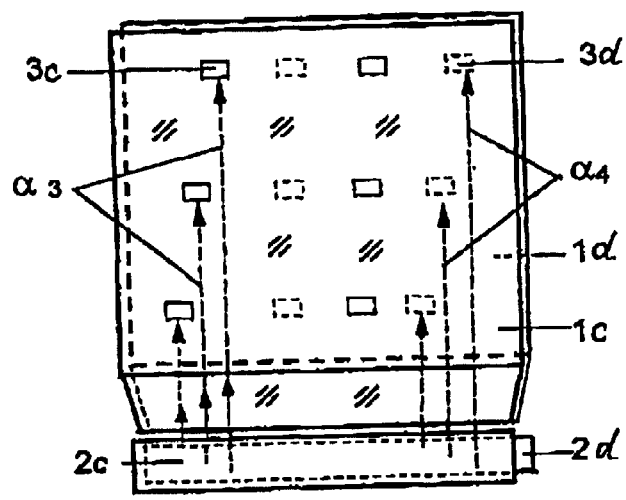
FIG. 4 shows the left frontal side of said screen.

In another embodiment or the projection system according to FIGS. 3 and 4: the viewing screen is implemented of two parallel flat transparent light guides 1$c$ and 1$d$, and have transparent entrance end-faces for inputting projection rays $\alpha_3$, and $\alpha_4$. Below, before the entrance end-face of light guide 1$c$; projector 2$c$, and before the end-face of light guide 1$d$ projector 2$d$ are positioned. On side c of the surface of light guide 1$c$ (front side c of the screen), on the area of observation of the screen images—light diffusers 3$c$; and on side d of the surface of light guide 1$d$ (front side d of the screen)—light diffusers 3$d$ are positioned. Light diffusers 3$c$ are intended to capture rays $\alpha_3$ (projected by projector 2$c$), for outputting the rays from the light guides, deflecting and diffusing said rays at angle $\beta_3$ of the screen image observation sector from side c. Light diffusers 3$d$ are intended to output rays $\alpha_4$ (projected by projector 2$d$), deflect and diffuse them in angle $\beta_4$ of the screen image observation sector from side d. The light guides are intended to supply the projected rays to predetermined light diffusers after multiple complete internal reflection thereof from the surface of said light guides.

Figure 5:
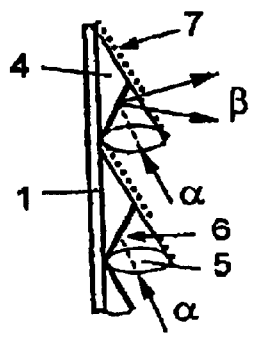
FIGS. 5($a$) and ($b$) shows the optical diagram of embodiments of a screen and light diffusers (in cross-sectional view of the screen)

In FIG. 5(a): on projection viewing screen 1, light diffusers 4 comprise positive lens 5, inclined flat mirror 6. From the screen image observation side, the light diffusers have anti-flare black opaque or photochrome coating 7 applied thereon. Lens 5 is intended for capturing and diffusing of rays (by focusing in angle $\beta_5$ of the screen image observation sector). The mirror is adapted to deflect the focused ray and output the same through a small transparent exit window of the light diffuser.

In another embodiment according to FIG. 5(b): a light diffuser is provided with a micro-prism to deflect the rays into a mirror-focon that diffuses the rays into the image observation sector. In other embodiments, on the screen for deflecting and simultaneous diffusing of the rays in angle $\beta_6$ of the image observation sector, only spherical or parabolic mirrors 6a are mounted.

Figure 6:
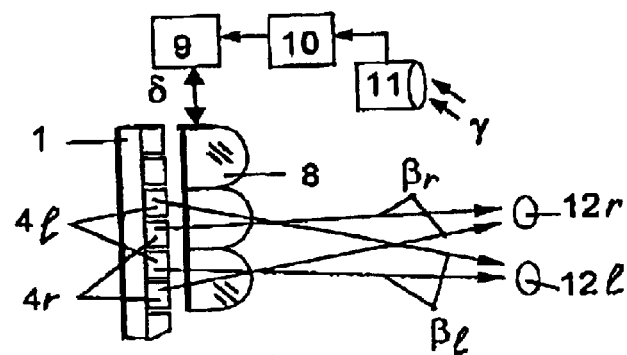
FIG. 6 shows a plan view of an optical system in cross-section of a viewing screen having a lenticular stereo raster and a system for automatic correction for optical registration of the stereoscopic vision zones with the viewer's eyes.

In FIG. 6 a stereoscopic projection system comprises viewing screen 1 having light diffusers 4l to form image elements of the left frame of a stereo couple, and light diffusers 4r to form image elements of the right frame of a stereo couple. From the viewer side, stereoscopic lenticular raster 8 to perform optical selection of the stereo couple frames is movably positioned along the direction denoted by arrow δ. Lenticular raster 8 is coupled to drive 9 of automatic corrector 10. The automatic corrector is coupled to sensor 11 to track (using rays γ reflected from a viewer's face) the spatial position of the viewer's eyes with respect to the stereo image vision zones. The automatic corrector is adapted to perform the optical conjugation of zone of vision of rays $\beta_1$ of the left image with the viewer's left eye 12l, and that of zone of vision of rays βr of the right image, accordingly, with the right eye 12r of said viewer. Such arrangement provides the continuous, without the need to use spectacles, easy viewing of a stereo image when a viewer is in front of the screen and moves laterally in respect of the screen.

The claimed projection system is operated as follows.

According to the first embodiment of FIGS. 1 and 2: two projectors 2a and 2b form and transform two projected images. Using the optical transformation, the projected image is broadened horizontally to the screen width, and is narrowed vertically to the optimal width of an image that is multiple times smaller in size than the screen height size. Projection rays $\alpha_1$ and $\alpha_2$ are directed at a predetermined small angle to the screen surface and narrowed in cross-section within the area of an entrance window of a light diffuser so that to perform a precise and complete capturing of each separate ray by one predetermined light diffuser. Projectors and light diffusers form the full-screen various images viewed by different viewers simultaneously from two sides of the screen, without optical interferences.

In FIGS. 3 and 4 the second embodiment of the claimed projection system having a viewing screen consisting of two flat-parallel light guides is operated as follows.

Below, from the end-face side of screen 1c and 1d, projectors 2c and 2d form the projected light fluxes of images in the form of narrowly diverging rays $\alpha_3$ and, correspondingly, $\alpha_4$. Projector 2c, from below through the end-face of light guide 1c projects rays $\alpha_3$. These rays are reflected inside the light guide in the form of rays $\alpha_3$ that diverge to points of certain light diffusers 3c, then they are outputted, deflected and diffused by said light diffusers in broad angle $\beta_1$ of the screen image observation sector from side c. Similarly, projector 2d forms the screen images to be viewed from the opposite side d of the screen.

FIG. 5(a) shows projection screen 1 having light diffusers 4 in the form of lenses 5 provided with flat inclined mirrors 6 and opaque black coating 7. Light diffusers are intended for complete capturing of direct projection rays α, which rays are focused by a lens and then are deflected by a mirror for diffusing them in angle $\beta_5$ of the screen image observation sector.

FIG. 5(b) illustrates another embodiment of projection screen 1 having different versions of light diffusers and coatings of the screen. The upper light diffuser is designed as optical prism 6c that deflects the projection rays and is conjugated with mirror-spherical or mirror-parabolic opening 6d (in the form of a focon). Below, in the screen height, disposed are light diffusers having spherical or parabolic mirrors 6a that protrude from the screen surface and serve to deflect and focus the projection says within a minimal area of the light diffuser' exit windows. In the light diffusers, in the middle portion of the screen height, mirrors of the light diffusers are conjugated with openings θ (in the form of a hollow focon) to carry out the induced ventilation of the exit windows when the screen is self-cleaned by the internal air pressure. In a light diffuser, in the nether portion of the screen height, micro-mirrors 6a are conjugated with transparent windows of the transparent screen. The screens can be transparent or coated with an anti-flare black opaque paint or applicable mesh 7a (within the screen area outside the exit windows).

According to another embodiment, on the screen (within the screen area outside the windows) photochrome coating 7a is applied to adjust the screen transparency using the ultraviolet background illumination. Angle $\beta_6$ is the angle of the sector of diffusing of the projection rays by micro-mirrors for viewing of the screen images.

In the stereo projection system in FIG. 6, stereo projectors form an automatic stereogramme in the form of horizontally alternating vertical strips of the left and right images of a stereo couple. Stereo raster 8 projects the left image into the left eye vision zone, and projects the right image into the right eye vision zone. Photosensitive sensor 11 receives rays γ, reflected from the viewer's face, to determine the eyes' spatial position according to the contrast of an image of the eyes and face. The sensor forms a control signal than is supplied to automatic corrector 10. Using drive 9, the automatic corrector automatically displaces the stereo raster to the optimal registration of the left image vision zones with viewer's left eye 12l, and that of the right image vision zone (rays $\beta_r$), respectively, with right eye 12r.

The preferred embodiment of the claimed projection system for use in a dust-laden environment, or under conditions of atmospheric precipitation, can consist of a design, wherein the projection space behind the screen is closed for protection against light, dust and humidity and where a projector can be accommodated. A projector can be disposed at any distance form the screen, and the transformed projection can be directed to the horizontal or vertical entrance window of the screen, or to the end-face mirror protected against dust and precipitation. For the purpose of the automatic continuous self-cleaning of the entrance and exit optical windows of the screen and that of the light diffusers, inside the projection space (isolated from the environment) a fan or compressor can be mounted for blowing the windows and also the micro-mirrors of the system that are similar to openings θ of the screen light diffusers as shown in FIG. 5(b), Another preferred embodiment of the projection system can be a design adapted for projection in interior of the glass of spectacles or light diffusers on the internal surface of the glass of spectacles. In this case micro-miniature light diffusers on the glass of spectacles can be invisible for eye and adapted not to affect visibility of the external objects viewed through the area of the glass of spectacles around the light diffusers. Using the ultraviolet background illumination of the photochrome layer within thickness of the glass of spectacles, transparency of spectacles for better viewing of the projected images can be adjusted. To ensure an high luminous efficacy of the projection, the light diffusers in spectacles are designed as having the minimum angle of diffusing of the projection rays only into the eye pupil area, which arrangement will reduce the projection power consumption hundreds times. Thereat, an excellent stereoscopy in a super-broad angle of the field of vision upto 140°, with any range of hue gradation, an enhanced brightness and contrast, an high accuracy of colour-rendering and resolution, which would not be attained using stereo screens of the known stereo projection systems, is achieved.

The proposed projecting mono- and stereoscopic systems provide the optimal optical and constructional parameters that cannot be achieved in the best analogues of the world prior art. The possibility of easy, without spectacles, viewing of stereo images at any aspect and in lateral movement of viewers, as well as an highly efficient projection in the glass of spectacles conforms with a considerable inventive step.

INDUSTRIAL APPLICABILITY

All proposed projection systems can be produced in series using the known manufacture techniques for producing projectors, stereo projectors, projection optical means and viewing screens having light reflectors or lenticular rasters. For automatic correction of a stereo projection system, the known systems for automatic correction of displacement of objects, that are provided with sensors for tracking the contrast elements of the objects for the purpose to determine spatial orientation of these objects and for automatic adaptation of a system, can be used. Thus the industrial feasibility of the invention is evident.

What is claimed is:

1. A projection system, comprising;
   a viewing screen;
   at least one projector disposed at about an edge of the viewing screen for projecting rays along a surface of the viewing screen, wherein the rays are projected at an acute angle to the surface;
   a plurality of optical elements disposed on the viewing screen, wherein the optical elements have entrance and exit windows, and wherein the entrance and exit windows have areas that are substantially smaller than area of the viewing screen; and
   means for aligning the cross sections of the projected rays with the entrance windows of the optical elements, wherein the optical elements are configured to capture the projected rays whose cross sections are aligned with the entrance windows and to reflect or deflect the captured projection rays through the exit windows into a sector of observation.

2. The projection system according to claim 1,
   further comprising a configuration for simultaneous viewing of different images from different viewing sectors, wherein the configuration comprises:
   at least two projectors that are arranged to simultaneously project different beams of rays corresponding respectively to the different images, and
   an optical arrangement of the optical elements for simultaneous capture of the different beams of rays from the projectors and for selective redirection of the different beams of rays corresponding respectively to the different images to respective different viewing sectors.

3. The projection system according to claim 1, wherein the viewing screen comprises a light guide having a core and transparent entrance end-faces, and wherein the light guide is configured to receive the projected rays through the transparent entrance end-faces and to propagate the received rays through the core by internal reflection,
   wherein the optical elements are configured on the light guide surface for selective capture and output of the propagated rays from the light guide at predetermined coordinates for screen image formation, and
   wherein the projector comprises means for generating and directing a narrow beam of a plurality of rays onto the transparent entrance end-faces at preselected coordinates of incidence, where the preselected coordinates of incidence of a particular ray are selected for the passage of the particular ray through the core to a corresponding optical element.

4. The projection system according to claim 3, wherein the core has a wedge-wise narrowed thickness in the direction of propagation of rays in the light guide from a transparent entrance end-face.

5. The projection system according to claim 1, wherein the viewing screen surfaces surrounding the exit windows comprise a treatment for absorption of parasitic illumination and spots, and wherein the treatment comprises any one of an anti-flare coating, an opaque black coating, an opaque black removable mesh, optically transparent viewing screen material, a meshwire optical filter cover, a photochrome coating that adjusts the transparency of the viewing screen by ultraviolet illumination, and any combination thereof.

6. The projection system according to claim 1, wherein the projector is equipped with a projection telephoto lens and an anamorphic cylindrical lens for a minimal magnification of a projection size in height and simultaneous magnification of the projection size to the screen width, further comprising at least one retrodirective reflector disposed at about the edges of the viewing screen to deflect the projection into an edge of the viewing screen.

7. The projection system according to claim 1, wherein the at least one projector is a transparency projector, the projection system further comprising an illuminator of transparent projected images in an optical arrangement that provides background illumination of projector slides by thin rays that diverge fan-wise, the cross-section of which rays being broadened within sizes of the area of entrance windows of the optical elements, whereby the projection images are transformed and the cross-section of the projection rays is narrowed without the use of projection lenses and transforming anamorphic lenses.

8. The projection system according to claim 1, wherein the at least one projector is a stereoscopic projector, wherein the viewing screen is a stereoscopic screen comprising a lens raster for spatial selection of the left and right images of a stereo couple into the viewing zones of the left and right images of the stereo couple by a viewer's left and right eyes, respectively, and wherein for the purpose of viewing of stereo images without the use of spectacles and when viewers move in a lateral direction, the system further comprises a correction system for conjugating the zones of viewing of the left and the right images, the correction system comprising:
   a sensor that tracks the coordinates of the viewers' eyes; and
   a coupled drive for movement of components of the projection system in response to the sensor, wherein the movements of the projection system comprise one of rotation of the stereoscopic screen about its vertical axis, shifting of the lens raster, shifting the stereoscopic projector along the viewing screen and any combination thereof.

9. The projection system according to claim 3, wherein the core has a substantially constant refractive index, wherein the core is covered by a cladding layer having a constant or step-wise varying refractive index that is less than the refractive index of the core, and wherein the entrance windows of the optical elements comprise material having a constant or a step-wise varying refractive index that is less than the reactive index of the core.

10. The projection system of claim 3 wherein the light guide comprises one of a flat parallel plate light guide, a laminate light guide, and a multistrip light guide.

11. The projection system of claim 1 wherein the optical elements comprises at least one of spherical micro-mirrors, microlenses, and micro-focones.

12. The projection system of claim 1, wherein the at least one projector provides a transformed projection of an image, further comprising a planar mirror disposed at an edge of the viewing screen, the planar mirror having a reflective area for reflecting the transformed projection of the image provided by the projector toward the screen at an acute angle.

13. The projection system of claim 1, comprising a plurality of mirrors disposed on the opposite edges of the viewing screen for multiple reflection of the projected rays, whereby a narrow cross-section of the projection rays within the area of the optical elements' entrance window is achieved.

* * * * *